UNITED STATES PATENT OFFICE.

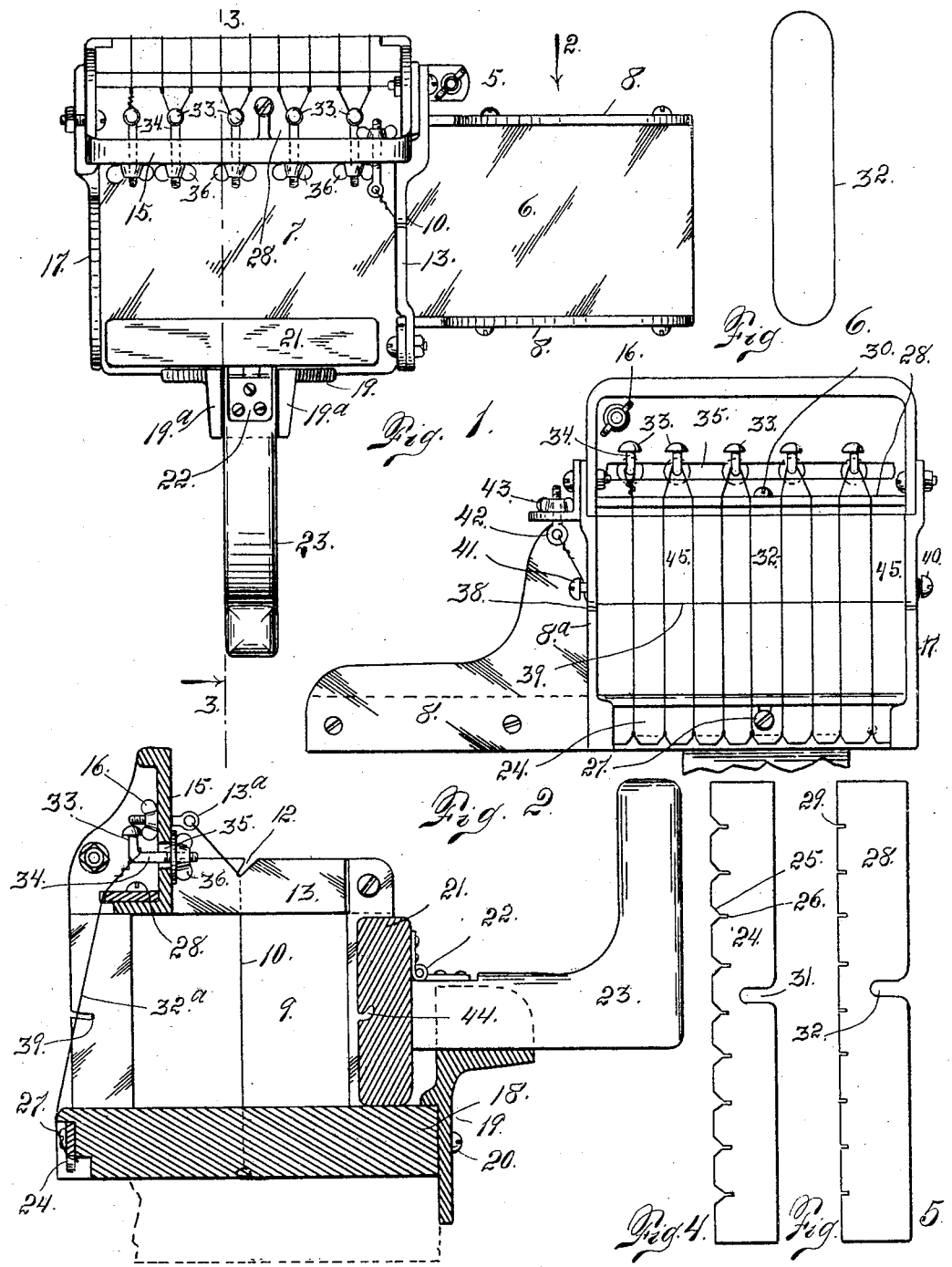

HARRY B. WATERS, OF DENVER, COLORADO.

BUTTER-CUTTER.

No. 805,602.     Specification of Letters Patent.     Patented Nov. 28, 1905.

Application filed September 2, 1905. Serial No. 276,795.

*To all whom it may concern:*

Be it known that I, HARRY B. WATERS, a citizen of the United States, residing in the city and county of Denver, State of Colorado, have invented certain new and useful Improvements in Butter-Cutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in butter-cutters of the class set forth in United States Letters Patent No. 686,667 issued to me November 12, 1901.

My present invention consists of certain improvements over the construction covered by the aforesaid patent, which improvements relate more particularly to the plates or devices for holding the cutting-wires. In my improved construction these devices are provided with spaced slots which the cutting-wires enter, the spaces between the slots determining the thickness of the pieces of butter into which the cake is finally subdivided. Whenever it is necessary to cut the cake of butter into pieces of less or greater thickness, the plates or pieces containing the spaced slots may be removed and others containing slots either farther apart or nearer together substituted therefor. In my improved construction, as illustrated in the drawings, the body of the device is provided with two compartments, the cake of butter being first placed in one of these compartments and moved into the other and finally moved at right angles to its original movement. Between the two compartments one or more wire cutters are located, whereby the cake of butter is divided during the original movement from one compartment into the other. The second movement of the cake is at right angles to the first and further subdivides the cake of butter, whereby it is formed into pieces suitable for use upon the table. The final subdivision of the butter cake is accomplished through the instrumentality of a series of cutters. These cutters are preferably composed of endless wire loops, one extremity of the loop engaging the slots of one of the cutter-holders, while the other extremity of the loop engages the slots of the other cutter-holder and is connected with a tension-screw, whereby the tension of the cutting-wires may be regulated at will.

Having briefly outlined my construction, as well as the function which it is intended to perform, I will proceed to describe the same in detail, reference being made to the accompanying drawings, in which is illustrated an embodiment thereof.

In the drawings, Figure 1 is a top or plan view of my improved device, showing the plunger at its rearward limited movement. Fig. 2 is what I will term a "front" elevation of the device, being a view looking in the direction indicated by arrow 2 in Fig. 1. Fig. 3 is a section taken on the line 3 3, Fig. 1. Fig. 4 is a detailed view of the lower cutter-holding plate. Fig. 5 is a similar view of the upper cutter-holding plate. In Figs. 4 and 5 the parts are shown on a larger scale than in the other views. Fig. 6 is a detailed view of one of the wire loops of which the butter-cutters are preferably composed.

The same reference characters indicate the same parts in all of the views.

Let the numeral 5 designate a casing provided with two compartments 6 and 7, the compartment 6 being provided with a bottom to which are attached side plates 8, preferably of the construction in Fig. 2. Between the compartments 6 and 7 is an opening 9, across which one or more wires 10 may be drawn for effecting the original division of the butter cake as it is forced from the compartment 6 into the compartment 7. The upper extremity of the cutter-wire 10 is passed through a slot 12, formed in a piece 13, which bounds the opening 9 above. After leaving the slot 12 the wire is connected with a screw-eye 13ª, threaded in a top plate 15, extending at right angles to the piece 13. To this screw-eye is applied a thumb-nut 16 for regulating the tension of the cutter-wire 10. It is evident that more than one wire may be stretched across the opening 9, according as it is desirable to divide the cake of butter into two or more pieces as it is moved from the compartment 6 to the compartment 7. The compartment 7 is provided on the side opposite the opening 9 with a plate 17. To the rear edge of the bottom 18 of the compartment 7 is attached a guide 19, preferably composed of metal. This guide is secured to the bottom of the compartment 7 by screws 20 or other suitable fastening devices. The butter cake is moved forwardly in the compartment 7 by a follower or plunger 21, which is hinged, as shown at 22, to a handle 23, adapted to pass between two lugs 19ª, with which the guide 19 is provided.

The forward extremity of the compartment 7 is provided with an opening 45. Below this opening is located a plate 24, having notches 25, which terminate on their lower extremities in narrow slots 26. These slots are suitably spaced. This plate is held in place by a screw 27, whereby it is readily removable. Occupying a position above the top of the opening 23 and extending at right angles to the slotted plate 24 is a similar plate 28, provided with spaced slots 29, whose distance apart corresponds with that of the slots 26 of the plate 24. This plate 24 is held in place by a suitable fastening-screw 30. These plates 24 and 28 are provided with open slots 31 and 32 to receive their fastening-screws. By virtue of these slots it only becomes necessary to slightly loosen the screws in order to remove the wire-holding plates. Each wire loop 32 when applied to the plates 24 and 28 is first connected at its lower extremity with the plate 24, after which it is applied to the spaced slots 29 of the plate 28. The upper extremity of the loop is then passed over the hooked end 33 of a tension-screw 34, which is passed through an opening 35, formed in the top plate 15. The extremity of this tension-screw remote from its hooked end is threaded, and to this threaded end is applied a thumb-nut 36, whereby the tension of the wire loop may be regulated at will.

As shown in the drawings, the wire loops between the plates 24 and 28 occupy an inclined position, as shown at 32ª. (See Fig. 3.)

Crossing the wire loops 32 at right angles is a cutter-wire 39, which engages slots formed in the forward edge of plate 17 and in a flange 8ª of the plate 8, respectively. One extremity of this wire is anchored by a screw 40, while the opposite extremity engages a guide-screw 41 and passes thence to a screw-eye 42, mounted on the frame or casing. To this screw-eye is applied a thumb-nut 43 for regulating the tension of the cutter-wire 39.

The plunger 21 is provided with a slot 44, adapted to receive the cutter-wire 39 as the plunger is moved forwardly in the act of forcing the cake of butter through the opening 45.

From the foregoing description the use and operation of my improved device will be readily understood. A cake of butter of any suitable size—say a pound, for instance—is first placed in the compartment 6 and shoved by the operator into the compartment 7, the cutter-wire 10 dividing it into two parts. The plunger 21 is then thrust forwardly, carrying the butter cake against the wire cutter 39 and the cutters 32, whereby the cake is further subdivided and whereby pieces are formed of appropriate size for use on the table. By virtue of the inclination of the wires 32 the top of the butter cake is first brought in contact with the cutters, since the upper extremities of these cutters are located farthest in the rear. In this way there is a sort of shearing cut making the cutting operation much easier than would be the case if the cutters occupied a vertical position whereby the entire cut were accomplished at the same instant. Furthermore, by the time the lower part of the cake is cut through the greater portion of the upper part thereof will have passed to a position forward of the cutting-wires, thus greatly facilitating the removal of the butter from the device.

Whenever it is desired to cut a cake of butter into smaller or larger pieces than can be done by the use of the plates 24 and 28, which have been employed, the said plates may be removed from the device and other plates appropriately spaced for the purpose may be put in position. This is done by simply loosening the screws 27 and 30, slipping the plates out, and putting others in position. The cutting-wires must of course be detached from the parts of the device with which they are connected and other cutting-wires placed in position and their tension regulated in the manner heretofore described.

It may also be stated that by virtue of the fact that the cross-wire 39 is located in the rear of the wires 32 the rear extremity of the cake of butter will have been forced forwardly beyond the cross-wire 39 before it comes in contact with the lower part of the wires 32. By virtue of this arrangement the tendency of the pieces of butter to cling to the wire cutters is minimized or practically done away with, since just before the completion of the butter-cutting act only the extreme lower portions of the cutters 32 are in contact with the butter.

Having thus described my invention, what I claim is—

1. In a butter-cutter the combination of a frame or casing having two compartments communicating with each other by an opening to allow the cake of butter to pass from the one compartment to the other, means arranged across said opening to divide the cake of butter into a plurality of pieces while moving from the first to the second compartment, the latter having an opening at its forward extremity, cutters arranged across the last-named opening, and removable pieces arranged on opposite sides of the opening upon which the cutters are mounted.

2. A butter-cutter provided with a butter-compartment having an escape-opening provided with wire cutters suitably arranged across the same, and removable pieces provided with spaced slots which the wires engage.

3. A butter-cutter consisting of a frame or casing having a butter-compartment provided with an escape-opening across which wire loops are suitably arranged, and removable pieces arranged on opposite sides of the opening and having spaced slots which the wire loops engage.

4. A butter-cutter provided with a butter-compartment having an escape-opening, removable pieces arranged on opposite sides of the opening and provided with slots correspondingly spaced, wire loops whose extremities engage the slots of the respective pieces, and a tension device connected with one extremity of each loop beyond the slotted piece.

5. A butter-cutter provided with a butter-compartment having an escape-opening, removable pieces arranged above and below the opening, and provided with spaced slots, wire loops forming cutters, the said loops engaging the slots of the said pieces, tension devices connected with the individual loops beyond the butter-cutter, the said loops occupying an inclined position, their upper extremities being rearmost, a cutter arranged at right angles to the inclined cutters, and in the rear of the same, and a plunger having a groove adapted to receive the rearwardly-located cutter, the said plunger having a handle hinged thereto to allow the plunger to assume an inclined position corresponding with that of the inclined cutters.

In testimony whereof I affix my signature in presence of two witnesses.

HARRY B. WATERS.

Witnesses:
DENA NELSON,
A. J. O'BRIEN.